US009251390B2

(12) United States Patent
Claessen

(10) Patent No.: US 9,251,390 B2
(45) Date of Patent: Feb. 2, 2016

(54) ITEM IDENTIFICATION DEVICE ANTENNA

(75) Inventor: Albert Claessen, Oakwood, GA (US)

(73) Assignee: NCR CORPORATION, Duluth, GA (US)

( * ) Notice: Subject to any disclaimer, the term of this patent is extended or adjusted under 35 U.S.C. 154(b) by 313 days.

(21) Appl. No.: 12/960,640

(22) Filed: Dec. 6, 2010

(65) Prior Publication Data

US 2012/0138682 A1    Jun. 7, 2012

(51) Int. Cl.
G06F 7/08 (2006.01)
G06K 7/10 (2006.01)
H01Q 1/22 (2006.01)
H01Q 7/00 (2006.01)

(52) U.S. Cl.
CPC .......... G06K 7/10336 (2013.01); H01Q 1/2216 (2013.01); H01Q 7/00 (2013.01)

(58) Field of Classification Search
USPC .......... 235/375, 376, 381, 383, 439; 705/14.24, 14.37, 22; 340/572.1, 340/572.5, 572.7, 572.8
See application file for complete search history.

(56) References Cited

U.S. PATENT DOCUMENTS

| 6,335,686 B1 * | 1/2002 | Goff et al. .................. 340/572.4 |
| 6,707,381 B1 | 3/2004 | Maloney |
| 6,842,115 B1 * | 1/2005 | Harris ..................... G06Q 20/20 235/381 |
| 7,432,817 B2 * | 10/2008 | Phipps et al. ............. 340/572.7 |
| 2004/0245280 A1 | 12/2004 | Schramm et al. |
| 2005/0010525 A1 | 1/2005 | Ross et al. |
| 2006/0232382 A1 * | 10/2006 | Bauer et al. .................. 340/10.1 |
| 2007/0136154 A1 * | 6/2007 | Chung ............................ 705/29 |
| 2007/0273529 A1 * | 11/2007 | Lee et al. .................... 340/572.7 |
| 2008/0211671 A1 | 9/2008 | Daily |
| 2009/0188983 A1 * | 7/2009 | Walker .......................... 235/494 |
| 2010/0156639 A1 | 6/2010 | Herwig et al. |
| 2011/0066514 A1 | 3/2011 | Maraz |
| 2012/0127307 A1 * | 5/2012 | Hassenzahl .................. 348/143 |

* cited by examiner

Primary Examiner — Michael G Lee
Assistant Examiner — Tabitha Chedekel
(74) Attorney, Agent, or Firm — Paul W. Martin; Schwegman, Lundberg, Woessner

(57) ABSTRACT

An item identification device antenna which provides better field coverage for reading item identification tags. The item identification device antenna includes a first portion coupled to a tag reader for reading a tag on an item, wherein the first portion is for radiating an electromagnetic field at a predetermined frequency, and a second portion in the electromagnetic field for resonating at the predetermined frequency to radiate another electromagnetic field for reading the tag. The tags may include radio frequency identification (RFID) tags.

12 Claims, 4 Drawing Sheets

ITEM IDENTIFICATION DEVICE ANTENNA

BACKGROUND

Radio frequency identification (RFID) tags are known for there usefulness in identifying items. RFID tag readers may be used in various venues, such as point-of-sale checkout, where RFID tag readers read RFID tags on merchandise items.

RFID readers may have limited output power (250 mW). Mounting limitations may result in a conventional RFID antenna covering only a limited volume, squandering what limited power is available. The RFID reader may not be able to read an RFID tag anywhere it may be located within a desired reading area.

It would be desirable to provide an antenna for an item identification device, such as an RFID reader, which expands reading volume.

SUMMARY

An item identification device antenna is provided.

The item identification device antenna includes a first portion coupled to a tag reader for reading a tag on an item, wherein the first portion is for radiating an electromagnetic field at a predetermined frequency, and a second portion in the electromagnetic field for resonating at the predetermined frequency to radiate another electromagnetic field for reading the tag. The tags may include radio frequency identification (RFID) tags.

DETAILED DESCRIPTION

Figure 1:
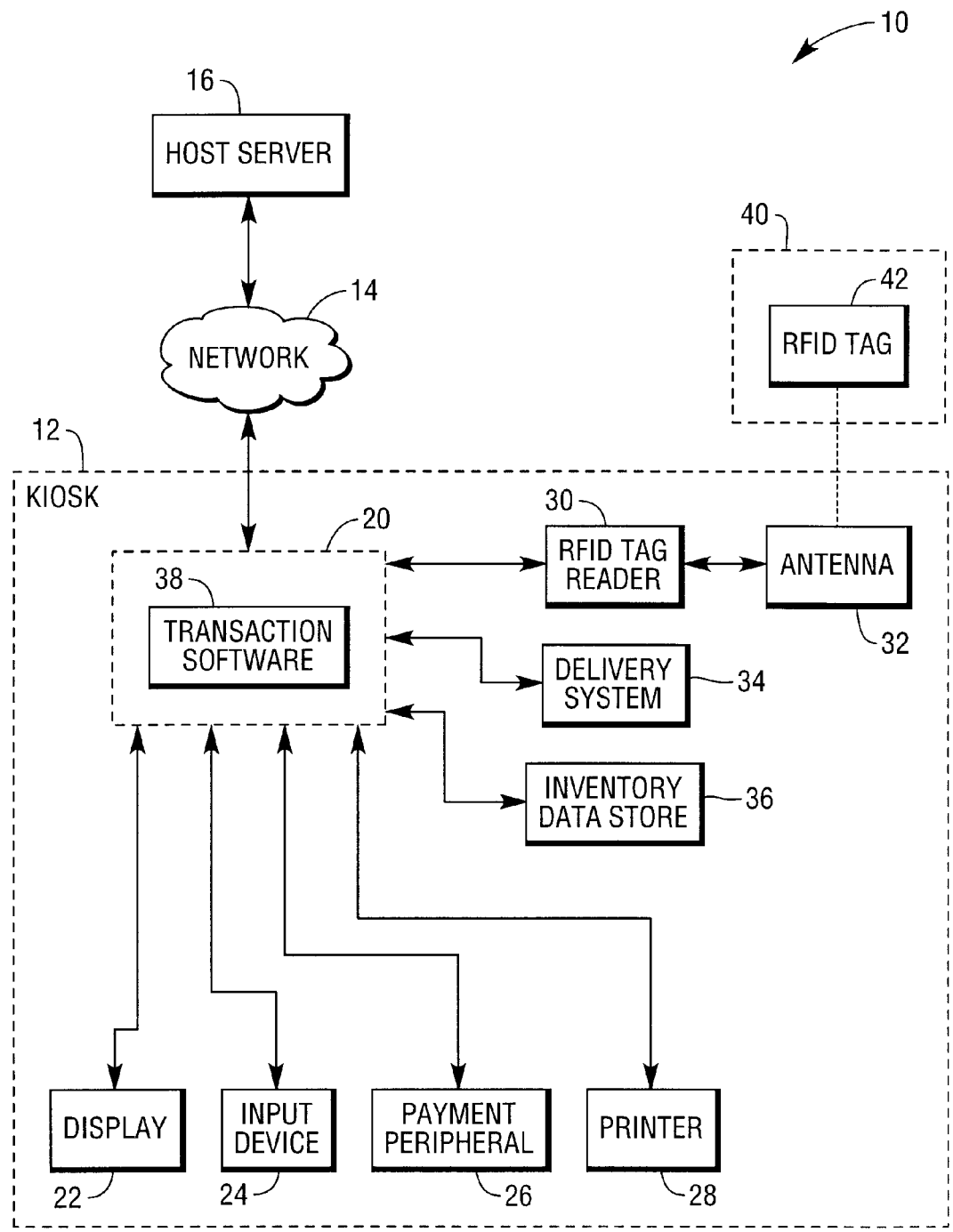
FIG. 1 is a block diagram of an example system which uses an RFID tag reader.

Referring now to FIG. 1, example media transaction system 10 primarily includes kiosk 12.

Kiosk 12 dispenses digital media in storage devices 40, which may include compact discs (CDs) and digital video discs (DVDs). CDs and DVDs are leading portable digital media storage devices. Hundreds of millions of discs are produced each year. These discs are used to store digital media files including, but not limited to movies, television shows, music, music videos, video game software, productivity software and a wide array of additional file types and file formats. These discs are available in pre-recorded, recordable and rewritable formats.

Kiosk 12 may also dispense digital media in other storage devices 40, such as Secure Digital (SD) cards, or may also electronically download digital media to customer provided storage devices.

Kiosk 12 may include computer 20, display 22, input device 24, payment peripheral 26, printer 28, radio frequency identification (RFID) tag reader 30, transport system 34, and inventor data store 36.

Computer 20 includes a processor, memory, program and data storage. Computer 20 may execute an operating system such as a Microsoft operating system, and a web browser for viewing web pages.

Computer 20 controls operation of kiosk 12. Computer 20 executes transaction software 38, which displays images of screens and records operator selections from those screens during a digital media transaction.

A digital media transaction may include a sale of digital media or licenses to digital media. Digital media may include, but not be limited to, movies, television shows, music, music videos, video game software, productivity software and a wide array of additional file types and file formats.

Display 22 displays the images of the transaction screens.

Input device 24 records operator selections during a digital media transaction. Input device 24 may include a touch sensitive device or a keyboard. Input device 24 and display 22 may be combined as a touch screen.

Payment peripheral 26 may include one or more of a card reader for reading credit, debit, and/or loyalty cards; a currency acceptor; a currency dispenser; a coin acceptor; and a coin dispenser.

Printer 28 includes a receipt printer, but may print additional information, such as coupons or other offers or promotions.

RFID tag reader 30 couples to antenna 32, which in this example, is located in the vicinity of a digital media dispense/return slot of kiosk 12. RFID tag reader 30 identifies dispensed or returned digital media or both.

Dispensed or returned storage devices 40, such as CDs and DVDs, are equipped with RFID tags 42. Alternatively, or in addition, containers of storage devices 40, such as sleeves, jewel cases, or other types of cases may include RFID tags 42.

Delivery system 34 delivers digital media to customers following selection and payment. For example, delivery system 34 may deliver digital media discs from storage locations within kiosk 12 or may burn digital media onto blank discs and deliver a newly burned disc. As another example, delivery system 34 may electronically download digital media to suitable electronic storage devices, such as customer provided mobile devices. Delivery system 34 also captures and stores returned digital media to the storage locations within kiosk 12.

Inventory data store 36 contains an inventory of digital media within kiosk 12, either physical discs or digital media files or both. Transaction software 38 updates the inventory of digital media each time a digital media item is dispensed or received. Transaction software 38 may also send updated inventory information to host server 16 via network 14. Host server 16 may manage inventory in a plurality of kiosks 12.

Network 14 may include a cellular communication network, a global communications network also known as the Internet, a wired or wireless network, or any combination of such networks.

Figure 2:
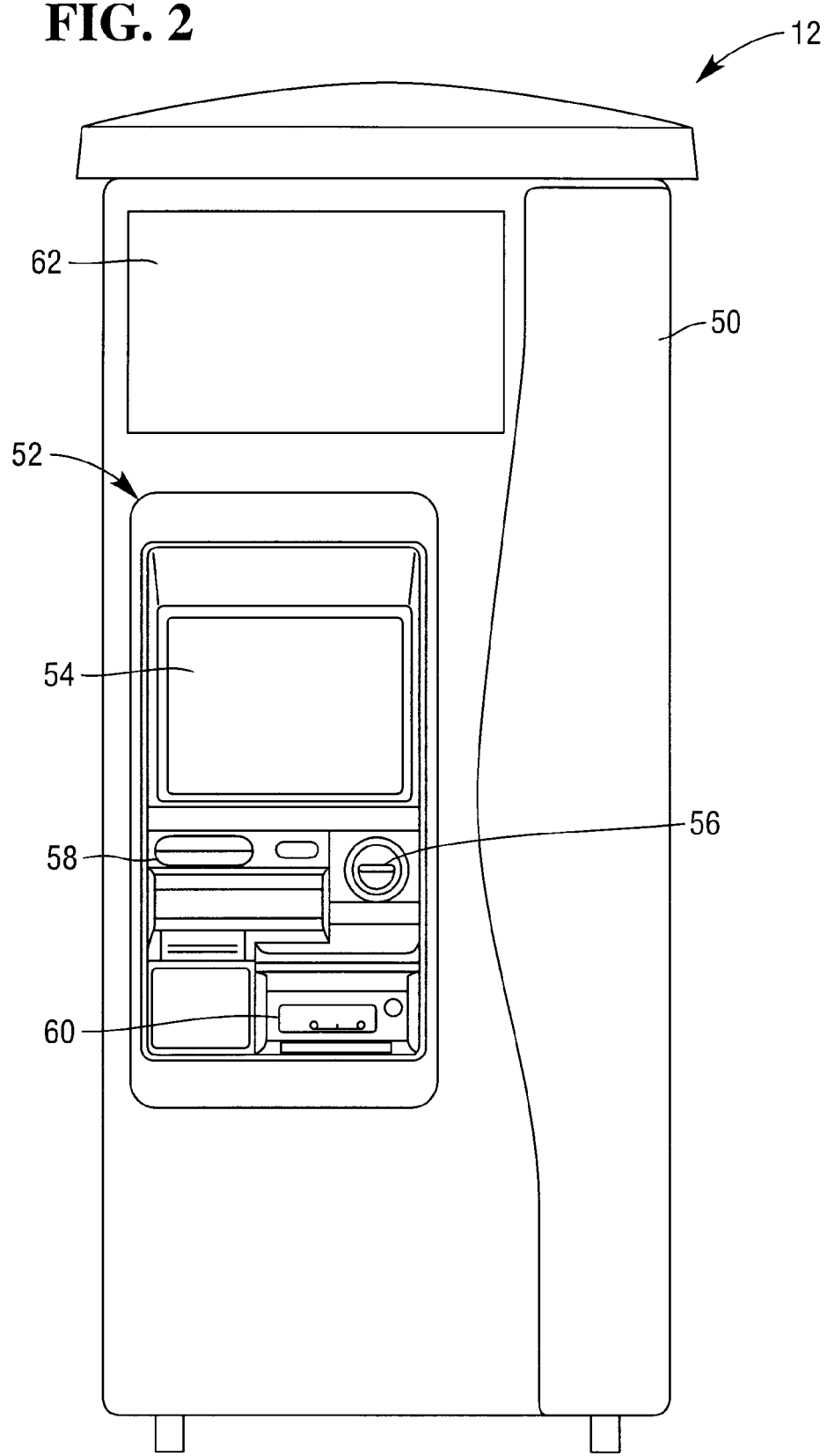
FIG. 2 is a front view of a user interface with an example return slot.

Referring to FIG. 2, an example kiosk 12 is illustrated. Example kiosk 12 may be based upon the entertainment kiosk disclosed in commonly-assigned published U.S. application Ser. No. 10/866,387, publication number 2004/0254676, entitled "AUTOMATED BUSINESS SYSTEM AND METHOD OF VENDING AND RETURNING A CONSUMER PRODUCT". This published application is hereby incorporated by reference.

Example kiosk 12 includes housing 50 for storing digital media. Kiosk 12 further includes user interface 52, which includes touch screen 54, card reader 56, printer 58, and dispense and retrieve slot 60.

Example kiosk 12 may further include auxiliary display 62 for displaying movie trailers, promotions, and other information under the control of transaction software 38.

Dispense and retrieve slot 60 includes a slot from which digital media items in cases are dispensed and into which empty cases may be inserted. RFID tag reader 30 may be located in dispense and retrieve slot 60 or on delivery system 34.

Figure 3:
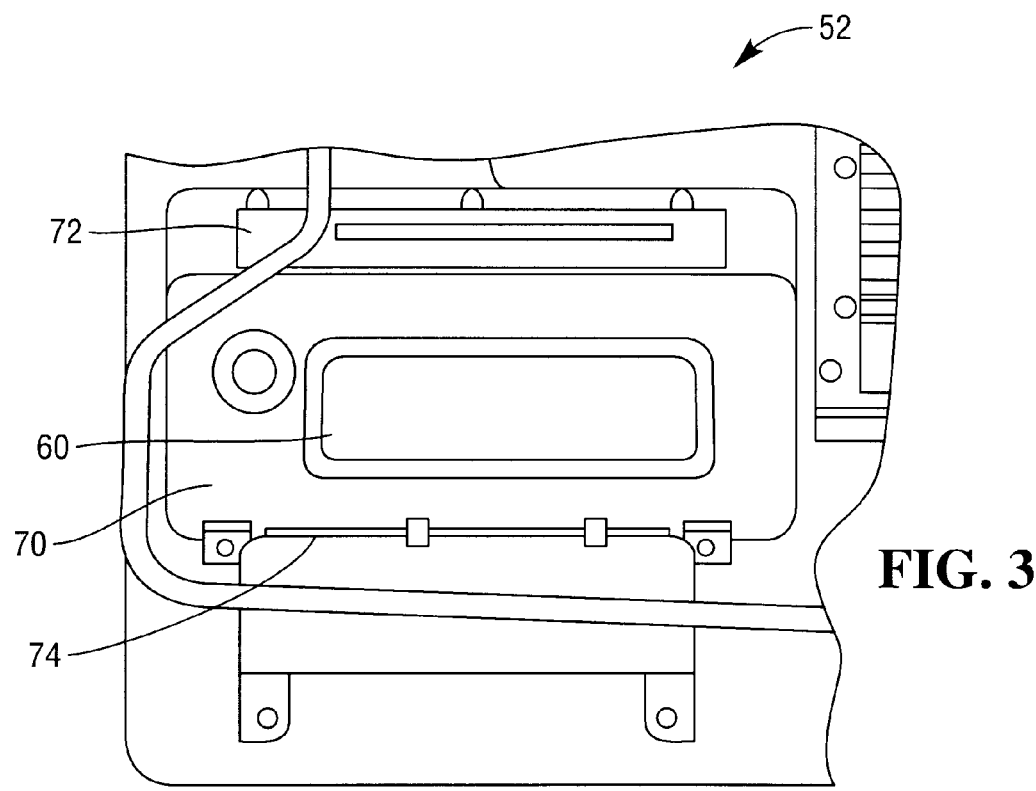
FIG. 3 is a rear view of the user interface.

With reference to FIG. 3, the rear side of user interface 52 illustrates the location of dispense and retrieve portion 70, including antenna portions 72 and 74. Antenna portion 72 is mounted or located below dispense and retrieve portion 70, while antenna portion 74 is mounted or located above dispense and retrieve portion 70.

During a return procedure at kiosk 12, a customer inserts protective storage case 80 into dispense and retrieve portion 70 and into slot 60. RFID tag reader 30 senses and reads RFID tag 42 on digital media storage device 40. Transaction software 38 looks up the digital media item associated with RFID tag 42 and verifies that digital media storage device 40 belongs in kiosk 12. Delivery system 34 transports digital media storage device 40 to a storage location with kiosk 12. Transaction software 38 updates inventory data 36 to reflect storage of digital media storage device 40 within kiosk 12.

Figure 4:
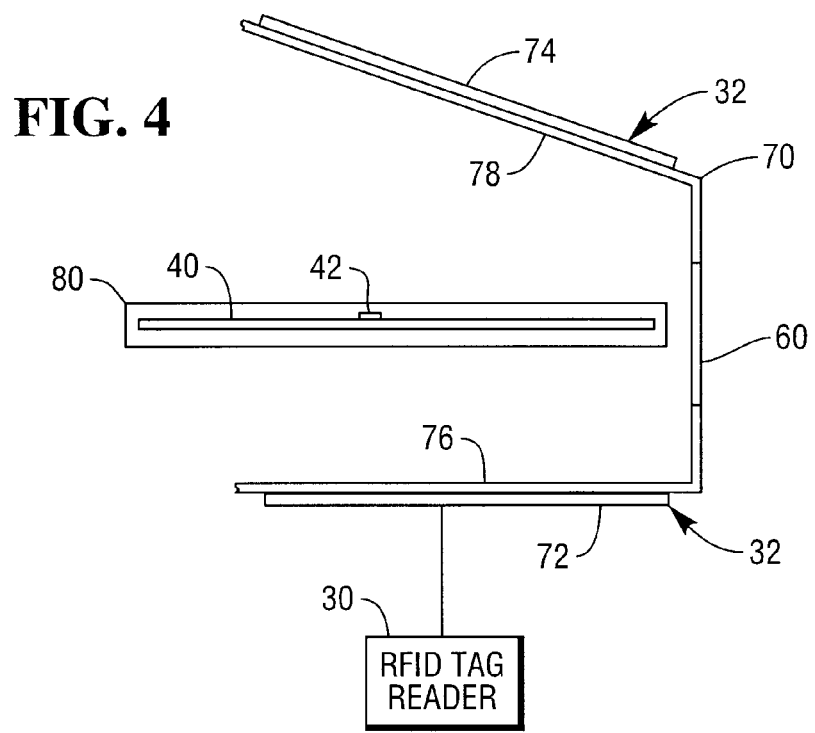
FIG. 4 is a cross-sectional view of the use interface at a dispense and return portion.

With reference to FIG. 4, a storage device 40 having RFID tag 42 is located between antenna portions 72 and 74 and within dispense and retrieve portion 70. Storage device 40 may be located within a protective storage case 80.

The walls of dispense and retrieve portion 70 should be constructed of a non-conductive, RF transparent material. Antenna portion 72 is located below bottom wall 76 and antenna portion 74 is located above upper wall 78. Antenna portion 74 is inclined at an angle relative to antenna portion 72, but other configurations are envisioned as user interface requirements change.

Antenna portion 72 is driven by RFID tag reader 30 to produce an electromagnetic field at an RFID frequency, such as 13.56 MHz. Antenna portion 74 is tuned to the same frequency and passively resonates to produce another electromagnetic field, thereby supplementing the electromagnetic field produced by antenna portion 72 to cover most of the volume in front of slot 60 where RFID tag 42 is located. Coverage is provided both below and above storage device 40 and is concentrated between antenna portions 72 and 74.

In an alternative embodiment, antenna portion 74 may be driven and antenna portion 72 may be passive.

RFID tag 42 receives the energy from the electromagnetic field and responds with a signal containing information identifying digital media storage device 40. Transaction software 38 uses the information to determine whether to accept digital media storage device 40. Transaction software 38 may deny acceptance if no RFID tag 42 is present or if the identification information in RFID tag 42 is not included in inventory records within inventory data store 36.

For example, transaction software 38 may cause delivery system 34 to either prevent insertion of digital media storage device through aperture 60, for example, by closing or failing to open a gate, or to allow insertion by opening the gate and to transport digital media storage device 40 to an internal storage location.

Figure 5:
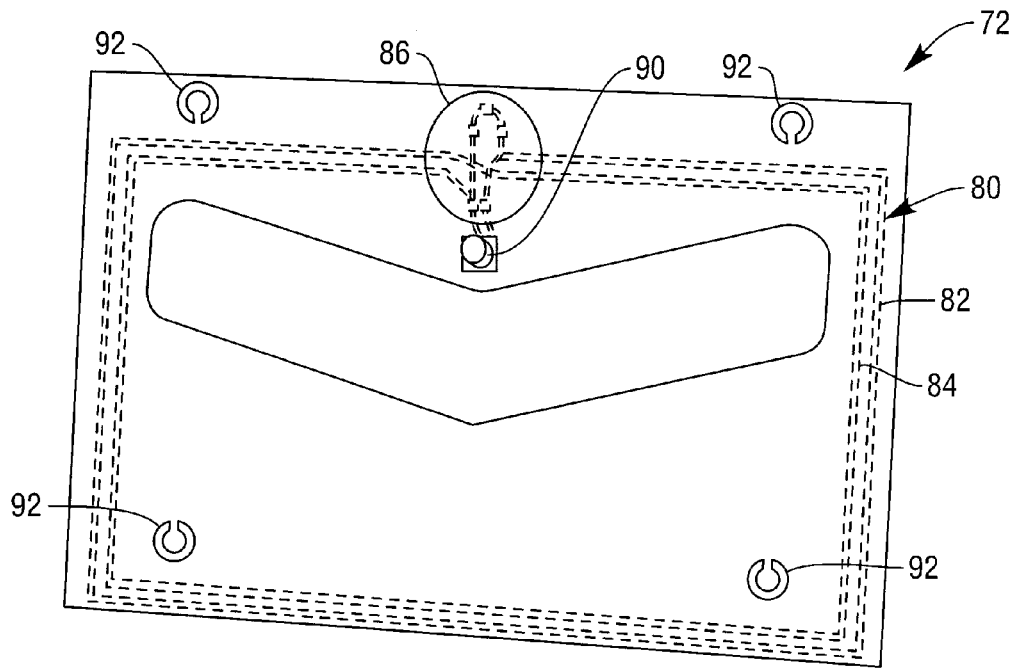
FIG. 5 is a view illustrating an example first antenna portion.

With reference to FIG. 5, example antenna portion 72 includes active loop antenna 80, which includes two conductive loops 82 and 84. Other configurations are also envisioned in which active loop antenna 80 includes one or more loops.

Antenna portion 72 further includes active loop tuning components 86 and coaxial connector 90. Connector 90 may include any suitable coaxial connector, such as a standard reverse polarity subminiature version A (RP-SMA) connector. The coaxial cable may include a fifty-ohm coaxial cable between connector 90 and RFID tag reader 30. Any transmission line suitable for 13.56 MHz RF can be used, for instance twisted pair cable and connectors.

Example antenna portion 72 may be constructed as a printed circuit board with loops 82 and 84, active loop tuning components 86 on one side and connector 90 on an opposite side. Antenna portion 72 may be fastened with loops 82 and 84 facing bottom wall 76 of dispense and retrieve portion 70 using screws or other suitable fasteners applied through apertures 92.

Figure 6:
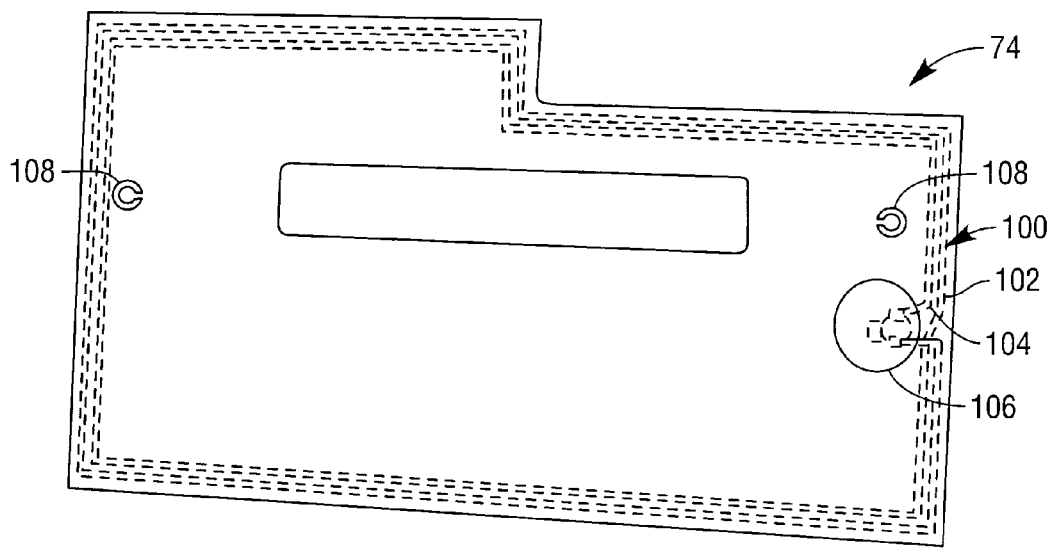
FIG. 6 is a view illustrating an example second antenna portion.

With reference to FIG. 6, example antenna portion 74 includes reflective loop antenna 100, which includes two conductive loops 102 and 104. Other configurations are also envisioned in which active loop antenna 80 includes one or more loops.

Antenna portion 74 further includes reflective loop tuning components 106, which may include capacitors. Reflective loop tuning components 106 may be selected or adjusted to produce resonance with active loop antenna 80 at the desired frequency of 13.56 MHz.

Example antenna portion 74 may be constructed as a printed circuit board with loops 102 and 104 and reflective loop tuning components 106 on one side. Antenna portion 74 may be fastened with loops 102 and 104 facing upper wall 78 of dispense and retrieve portion 70 using screws or other suitable fasteners applied through apertures 108.

Although particular reference has been made to certain embodiments, variations and modifications are also envisioned within the spirit and scope of the following claims.

The invention claimed is:

1. An item identification device antenna for use in a disc rental kiosk comprising:
a first portion coupled to a tag reader of the kiosk, wherein the first portion is for radiating an electromagnetic field at a predetermined frequency in a first direction for reading a tag on a disc to be returned to the kiosk; and
a second portion coupled to the kiosk, the second portion being in the electromagnetic field for resonating at the predetermined frequency and for radiating another electromagnetic field in a second direction opposite to the first direction for reading the tag when the disc is between the first and second portions before the disc passes into the kiosk through a disc return slot of the kiosk, and wherein walls of the disc return slot are constructed of a non-conductive material, and wherein the second portion is inclined at an angle relative to the first portion, and wherein first portion is situated below a bottom wall of the disc return slot and the second portion is situated above an upper wall of the disc return slot, and wherein the return slot is configured to open when the tag is identified in an inventory and the return slot is configured to shut when the tag is not identified in the inventory.

2. The antenna of claim 1, wherein the tag comprises a radio frequency identification tag.

3. The antenna of claim 1, wherein the first portion comprises a number of loops.

4. The antenna of claim 3, wherein the first portion further comprises tuning components for tuning the first portion to the predetermined frequency.

5. The antenna of claim 1, wherein the second portion comprises a number of loops.

6. The antenna of claim 5, wherein the second portion further comprises tuning components for tuning the second portion to the predetermined frequency.

7. The antenna of claim 1, wherein the one electromagnetic field and the other electromagnetic field overlap.

8. An item identification device antenna for use in a disc rental kiosk comprising:
   a first loop antenna coupled to the kiosk, the first loop antenna coupled to a radio frequency identification (RFID) tag reader for radiating an electromagnetic field at an RFID tag reading frequency in a first direction towards a disc to be returned to the kiosk; and
   a second loop antenna coupled to the kiosk, the second loop antenna in the electromagnetic field tuned to the RFID tag reading frequency, wherein the second loop antenna resonates at the RFID tag reading frequency and radiates another electromagnetic field in a second direction opposite to the first direction, wherein the one and the other electromagnetic fields overlap for reading an RFID tag on the disc when the disc is between the first and second loop antennas before the disc passes into the kiosk through a disc return slot of the kiosk, and wherein walls of the disc return slot are constructed of a non-conductive material, wherein the second loop antenna is inclined at an angle relative to the first loop antenna, and wherein first loop antenna is situated below a bottom wall of the disc return slot and the second loop antenna is situated above an upper wall of the disc return slot, and wherein the return slot is configured to open when the RFID tag is identified in an inventory and the return slot is configured to shut when the RFID tag is not identified in the inventory.

9. A method of creating an item identification field for use in a disc rental kiosk comprising:
   radiating an electromagnetic field at a predetermined frequency in a first direction for reading an item identification tag of a disc to be returned by a first antenna portion coupled to a tag reader of a kiosk; and
   resonating at the predetermined frequency to radiate another electromagnetic field in a second direction opposite to the first direction by a second antenna portion of the kiosk, wherein the second antenna portion is in the electromagnetic field, and wherein the item identification tag is external to the kiosk and between the first antenna portion and the second antenna portion before the disc passes into the kiosk through an item return slot of the kiosk, and wherein walls of the item return slot are non-conductive, and wherein the second antenna portion is inclined at an angle relative to the first antenna portion, and wherein first antenna portion is situated below a bottom wall of the item return slot and the second antenna portion is situated above an upper wall of the item return slot, and wherein the return slot is configured to open when the item identification tag is identified in an inventory and the return slot is configured to shut when the item tag is not identified in the inventory.

10. The method of claim 9, wherein the item identification tag is located between the first and second antenna portions during reading.

11. The method of claim 9, wherein the one electromagnetic field and the other electromagnetic field overlap.

12. The method of claim 9, wherein the tag comprises a radio frequency identification tag.

\* \* \* \* \*